US012738432B2

(12) United States Patent
Kuroda et al.

(10) Patent No.: US 12,738,432 B2
(45) Date of Patent: Sep. 15, 2026

(54) SWITCH DEVICE

(71) Applicant: ALPS ALPINE CO., LTD., Tokyo (JP)

(72) Inventors: Yoshimasa Kuroda, Miyagi (JP); Katsutoshi Usui, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 268 days.

(21) Appl. No.: 18/779,604

(22) Filed: Jul. 22, 2024

(65) Prior Publication Data

US 2024/0379307 A1 Nov. 14, 2024

Related U.S. Application Data

(63) Continuation of application No. PCT/JP2023/005015, filed on Feb. 14, 2023.

(30) Foreign Application Priority Data

Feb. 16, 2022 (JP) ................................ 2022-022140

(51) Int. Cl.
*H01H 13/64* (2006.01)
*H01H 13/48* (2006.01)
*H01H 13/52* (2006.01)

(52) U.S. Cl.
CPC ............ *H01H 13/64* (2013.01); *H01H 13/48* (2013.01); *H01H 13/52* (2013.01)

(58) Field of Classification Search
CPC ........ H01H 13/64; H01H 13/48; H01H 13/52; H01H 2205/026; H01H 2013/525;
(Continued)

(56) References Cited

U.S. PATENT DOCUMENTS 6,262,381 B1 7/2001 Kikuchi et al.
6,906,274 B2 * 6/2005 Ito ...................... H01H 13/7006 200/341
2011/0303520 A1 12/2011 Burnel et al.

FOREIGN PATENT DOCUMENTS

CA 2636748 A1 * 1/2009 ............ H01H 13/64
JP H10-112240 4/1998
(Continued)

OTHER PUBLICATIONS

International Search Report for PCT/JP2023/005015 mailed on Apr. 25, 2023.

*Primary Examiner* — Ahmed M Saeed
(74) *Attorney, Agent, or Firm* — IPUSA, PLLC

(57) ABSTRACT

A switch device includes a housing that includes a central fixed contact and a first peripheral fixed contact that are at a central portion of a bottom surface of a recessed portion of the housing, and a second peripheral fixed contact that is at a peripheral portion of the bottom surface of the recessed portion; a first movable contact that is disposed on an upper side of the central portion of the bottom surface of the recessed portion and is in contact with the first peripheral fixed contact; a second movable contact that is disposed on an upper side of the first movable contact and is in contact with the first movable contact and the second peripheral fixed contact; and a first stem that is disposed on an upper side of the second movable contact and is configured to press the first movable contact toward the central fixed contact.

15 Claims, 14 Drawing Sheets

(58) Field of Classification Search
CPC .. H01H 15/102; H01H 13/7006; H01H 13/44; H01H 13/85; H01H 13/26; H01H 13/20; H01H 13/14; H01H 13/04; H01H 13/02; H01H 13/807
See application file for complete search history.

(56) References Cited

FOREIGN PATENT DOCUMENTS

| | | | |
|---|---|---|---|
| JP | 2000-208002 | 7/2000 | |
| JP | 2001-283690 | 10/2001 | |
| JP | 2002-124153 | 4/2002 | |
| JP | 2002-352664 | 12/2002 | |
| JP | 2006-173004 | 6/2006 | |
| JP | 3177835 U | 8/2012 | |
| WO | WO-2019087556 A1 * | 5/2019 | ............ H01H 13/48 |

* cited by examiner

SWITCH DEVICE

CROSS-REFERENCE TO RELATED APPLICATIONS

This application is a continuation application of International Application No. PCT/JP2023/005015, filed on Feb. 14, 2023, and designated the U.S., which is based upon and claims priority to Japanese Patent Application No. 2022-022140, filed on Feb. 16, 2022, the entire contents of which are incorporated herein by reference.

BACKGROUND

1. Field of the Invention

The present disclosure relates to a switch device.

2. Description of the Related Art

Japanese Laid-Open Patent Application No. 2002-124153 discloses a two-step switch. In this disclosed two-step switch, first, an electric circuit is closed by bringing a movable tongue portion of a leaf spring into contact with an invertible spring. Subsequently, in response to the movable tongue portion pushing down the invertible spring, the invertible spring becomes inverted and contacts the central fixed contact, thereby achieving a conductive state between an outer peripheral fixed contact and the central fixed contact.

SUMMARY

A switch device according to one embodiment includes: a housing that includes a central fixed contact and a first peripheral fixed contact that are at a central portion of a bottom surface of a recessed portion of the housing, and a second peripheral fixed contact that is at a peripheral portion of the bottom surface of the recessed portion; a first movable contact that is disposed on the upper side of the central portion of the bottom surface of the recessed portion and is in contact with the first peripheral fixed contact; a second movable contact that is disposed on the upper side of the first movable contact and is in contact with the first movable contact and the second peripheral fixed contact; and a first stem that is disposed on an upper side of the second movable contact and is configured to press the first movable contact toward the central fixed contact. In response to pressing against the first stem, the first stem presses the first movable contact, and the first movable contact separates from the second movable contact and becomes inverted, thereby contacting the central fixed contact.

DETAILED DESCRIPTION OF THE DISCLOSURE

Figure 1:
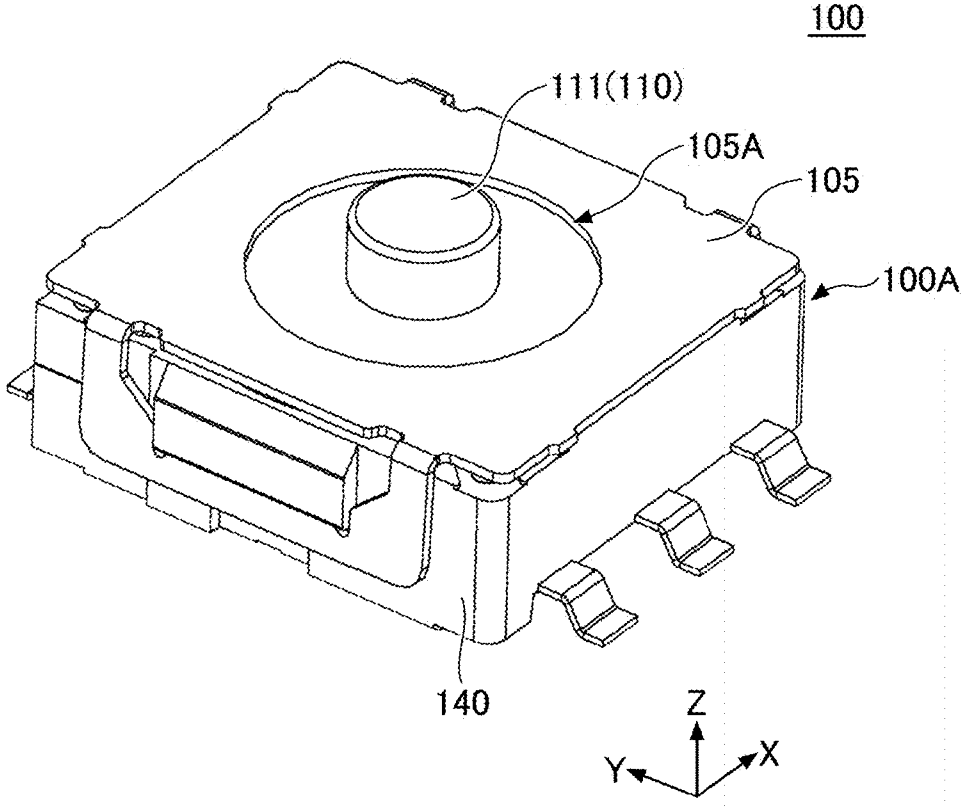
FIG. 1 is an external perspective view of a switch device according to one embodiment.

With a technique disclosed in Japanese Laid-Open Patent Application No. 2002-124153, it is not possible to perform switching between two switch circuits because an electric circuit is open when pressing is not performed.

Embodiments will now be described with reference to the drawings. In the following description, for the sake of convenience, a positive Z-axis direction in the drawings refers to being upward, and a negative Z-axis direction in the drawings refers to being downward.

(Outline of a Switch Device 100)

FIG. 1 is an external perspective view of a switch device 100 according to one embodiment. As illustrated in FIG. 1, the switch device 100 includes a casing 100A having a rectangular parallelepiped shape that is thin in a vertical direction (a Z-axis direction). The casing 100A includes a housing 140 and a frame 105 attached to the upper portion of the housing 140. The casing 100A houses a first stem 110. An operation part 111 of the first stem 110 projects upward from a circular opening 105A formed in the frame 105.

The switch device 100 is in a first ON state while in an initial state in which the operation part 111 of the first stem 110 is not pressed. In the first ON state, a first peripheral fixed contact 142 (see FIG. 2) and a second peripheral fixed contact 146 (see FIG. 2) that are provided in the housing 140 are in a conductive state through a metal contact 130 (see FIG. 2).

The switch device 100 is switched to a second state by pressing the operation part 111 of the first stem 110. In a second ON state, the first peripheral fixed contact 142 and a central fixed contact 144 (see FIG. 4) that are provided in the housing 140 are in the conductive state through the metal contact 130.

When the pressing against the operation part 111 of the first stem 110 is released, the switch device 100 automatically returns to the first ON state by the action of elastic forces of the first stem 110 and the metal contact 130.

(Configuration of the Switch Device 100)

Figure 2:
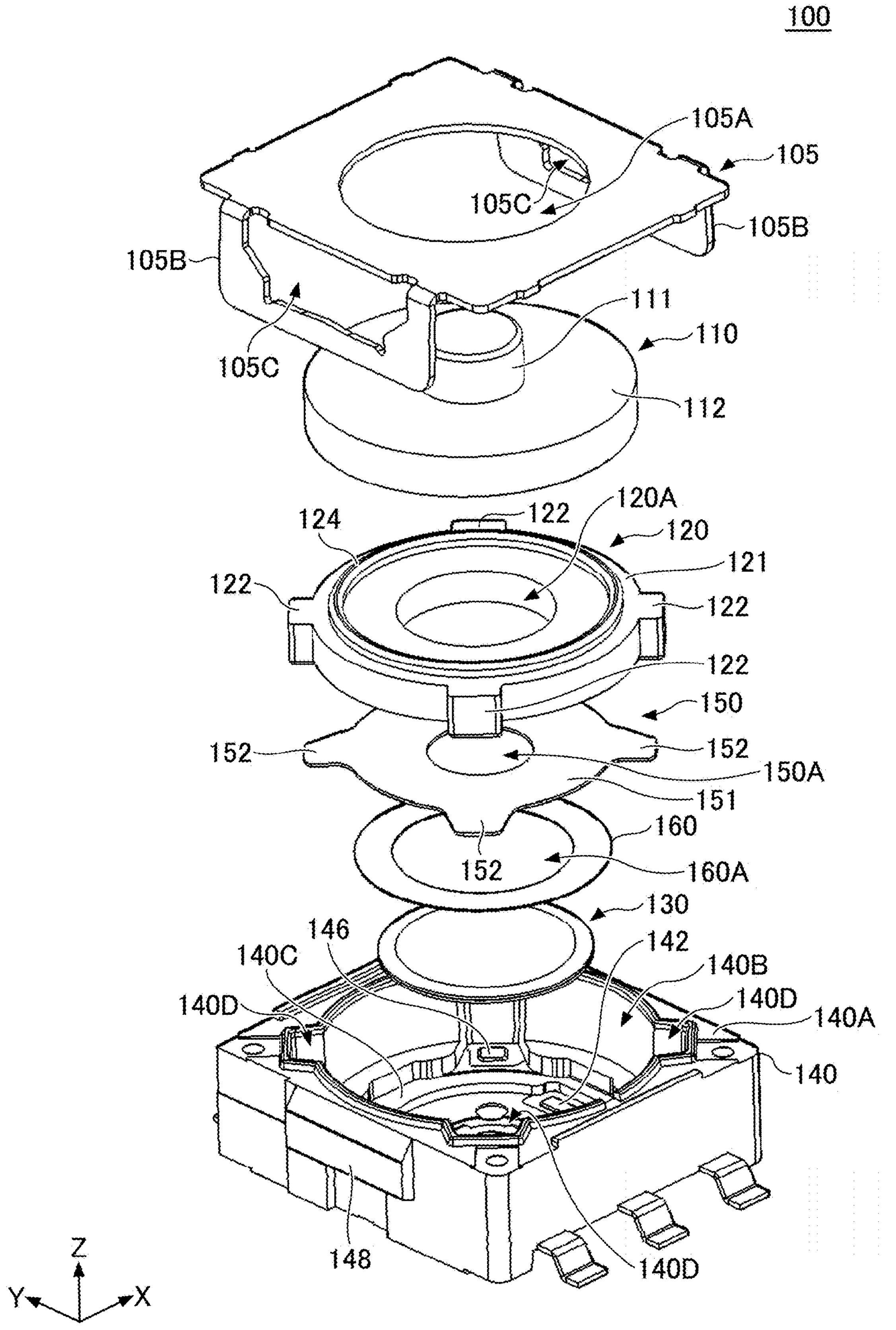
FIG. 2 is an exploded perspective view of the switch device according to one embodiment.
Figure 3:
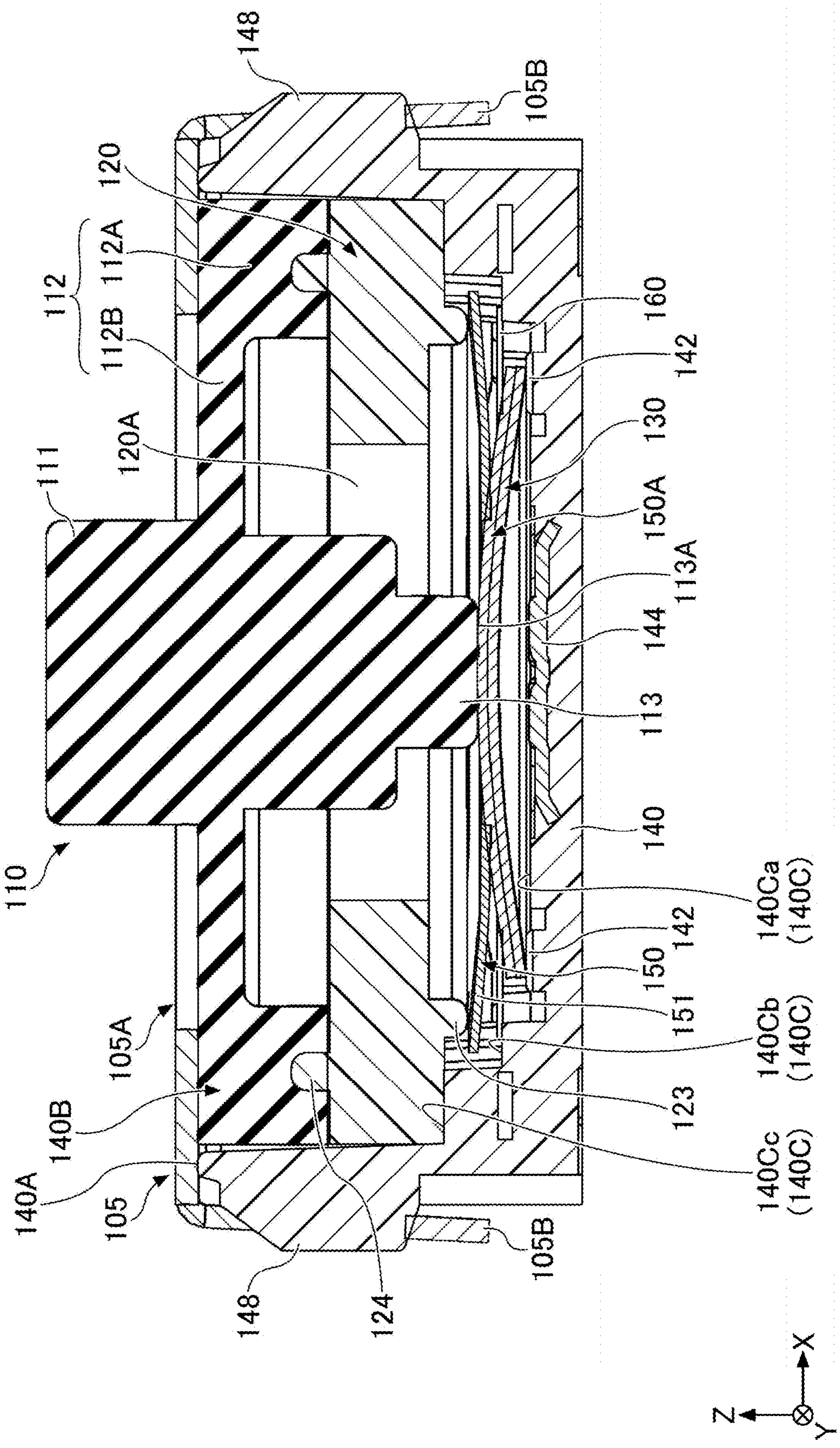
FIG. 3 is a cross-sectional view of the switch device according to one embodiment.
Figure 4:
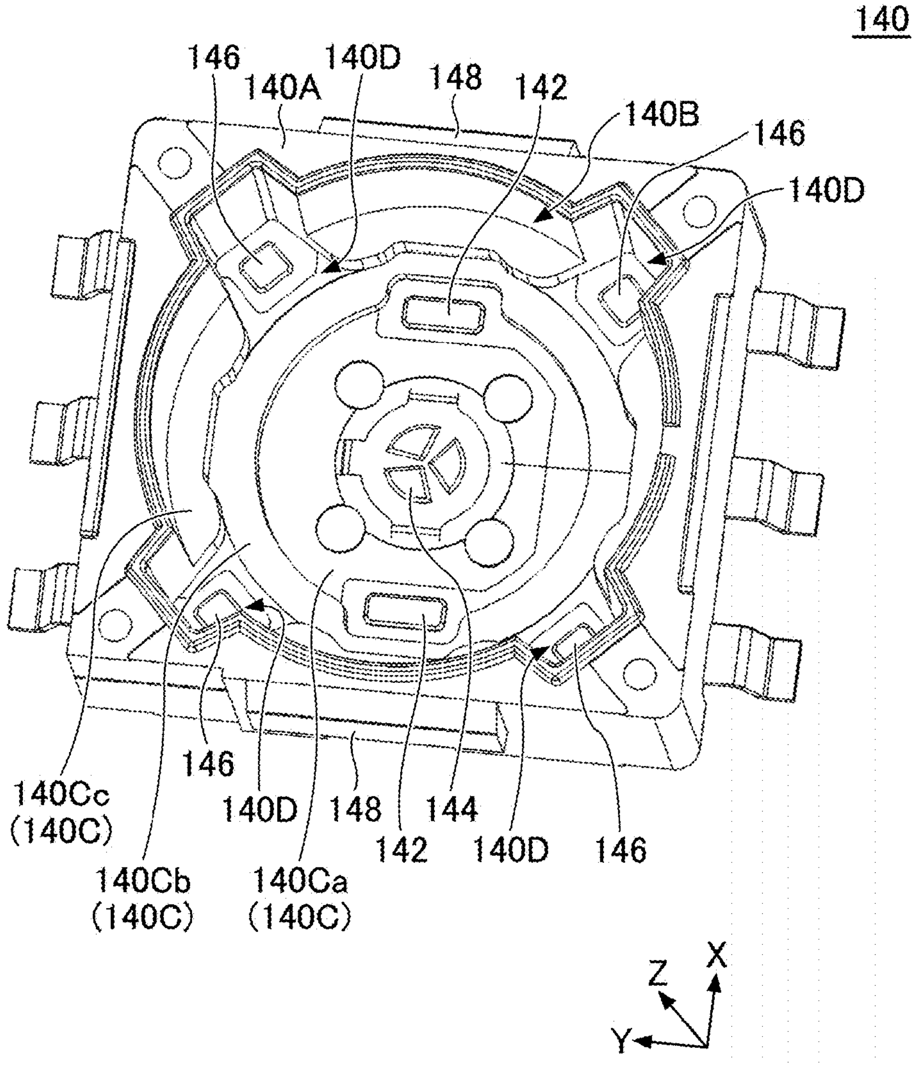
FIG. 4 is an external perspective view of a housing included in the switch device according to one embodiment.
Figure 5:
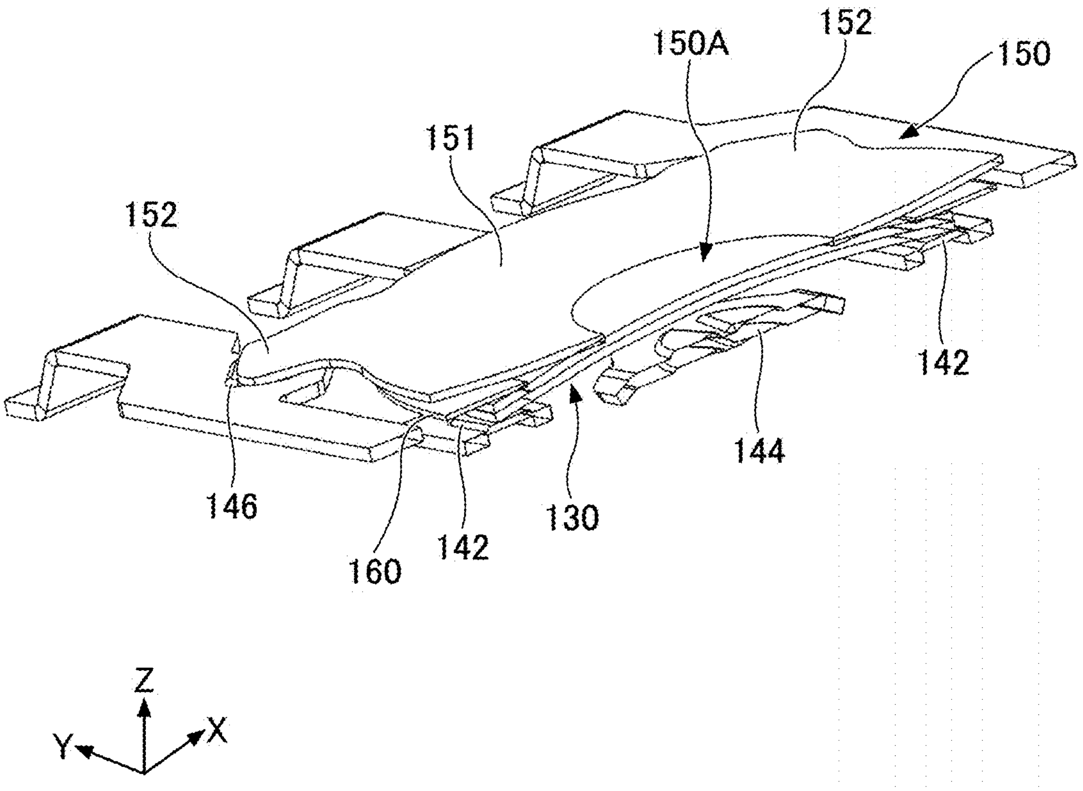
FIG. 5 is a cross-sectional view of some components included in the switch device according to one embodiment.

FIG. 2 is an exploded perspective view of the switch device 100 according to one embodiment. FIG. 3 is a cross-sectional view of the switch device 100 according to one embodiment. FIG. 4 is an external perspective view of the housing 140 included in the switch device 100 according to one embodiment. FIG. 5 is a cross-sectional view of some components included in the switch device 100 according to one embodiment. FIGS. 3 and 5 are cross-sectional views of the switch device 100 taken along a cross-sectional line that is parallel to an X-axis passing through the center of the switch device 100.

As illustrated in FIG. 2, the switch device 100 includes the frame 105, the first stem 110, a second stem 120, a second movable contact 150, an insulation sheet 160, the metal contact 130, and the housing 140 in the order from the above.

<Frame 105>

The frame 105 is a metal and flat-plate member that is attached to an upper surface 140A of the housing 140 to form the casing 100A together with the housing 140. The frame 105 is fixed to the upper surface 140A of the housing 140 to close the upper opening of a recessed portion 140B in a state in which the components (the first stem 110, the second stem 120, the second movable contact 150, the insulation sheet 160, and the metal contact 130) are housed in the recessed portion 140B of the housing 140.

For example, the frame 105 is formed by machining a metal plate. In a plan view from the top (from a positive Z-axis direction), the circular opening 105A is formed at the center of the frame 105. The operation part 111 of the first stem 110 is projected upward through the circular opening 105A. A hook 105B hanging downward is provided on each of the two sides that are at the outer peripheral edge of the frame 105 and are parallel to a Y-axis. The hook 105B includes an opening 105C, and a claw 148 provided on a side surface of the housing 140 is fitted into the opening 105C. Thus, the hook 105B fixes the frame 105 to the housing 140.

<First Stem 110>

The first stem 110 is a member that is pressed downward by an operator. The first stem 110 is in a stacked arrangement with the frame 105, the first stem 110 being on the bottom side of the frame 105 (on the negative Z-axis side). As illustrated in FIG. 2, the first stem 110 includes the operation part 111, a support 112, and a pressing part 113.

The operation part 111 is disposed at the center of the first stem 110 and has an approximately cylindrical shape. The operation part 111 is a part to be pressed by the operator.

The support 112 is integrally provided with the operation part 111 around the operation part 111, and is a horizontal disc-shaped part configured to support an outer peripheral surface of the operation part 111. The support 112 includes an annular thick portion 112A along an outer peripheral edge of the support 112. The support 112 also includes a thin portion 112B inward of the thick portion 112A, the thin portion 112B having a thickness smaller than that of the thick portion 112A. The thin portion 112B supports the outer peripheral surface of the operation part 111. According to the first stem 110, in response to pressing against the operation part 111, the thin portion 112B elastically deforms, and thus the operation part 111 can move downward.

The pressing part 113 is a cylindrical part that is disposed integrally with the operation part 111. The pressing part 113 is disposed at the center of the first stem 110 and on the lower side of the operation part 111. A bottom surface of the operation part 111 is a pressing surface 113A configured to press the top portion of the metal contact 130. As illustrated in FIG. 3, the first stem 110 is disposed in a state in which the pressing part 113 penetrates through the opening 120A of the second stem 120, and the pressing surface 113A contacts the top portion of the metal contact 130.

The first stem 110 is held between the frame 105 and the second stem 120 in the thick portion 112A of the support 112. In the first stem 110, the operation part 111 projects upward of the frame 105 through the opening 105A of the frame 105. Thus, the first stem 110 can be pressed downward by the operator from above the frame 105. For example, the first stem 110 is formed using an elastic material (e.g., silicone, rubber, or the like).

<Second Stem 120>

The second stem 120 is an annular member disposed below the first stem 110 (on the negative Z-axis side) and above the second movable contact 150 (on the positive Z-axis side) and having a constant thickness in the vertical direction (in the Z-axis direction). In a plan view from the top (from positive Z-axis side), a circular opening 120A is formed at the center of the second stem 120. The operation part 111 of the first stem 110 penetrates through the circular opening 120A.

The second stem 120 includes an annular base 121 and a plurality of projections 122 projecting outward of the base 121. In the present embodiment, the second stem 120 includes four projections 122 that are disposed at 90° intervals. The four projections 122 are disposed at four cut-out portions 140D that are formed in the recessed portion 140B of the housing 140. The second stem 120 is disposed at an upper surface of a second peripheral portion 140Cc in which an annular portion of the base 121 along the outer peripheral edge on the lower surface of the base 121 is formed on a bottom surface 140C of the recessed portion 140B of the housing 140.

The second stem 120 includes an annular lower rib 123 on the lower surface of the base 121. As illustrated in FIG. 3, the lower rib 123 contacts an upper surface of a base 151 of the second movable contact 150 along an outer peripheral edge of the base 151 of the second movable contact 150, thereby restricting upward movement of the second movable contact 150.

The second stem 120 includes an annular upper rib 124 on an upper surface of the base 121. The upper rib 124 contacts and adheres to a lower surface of the thick portion 112A along the outer peripheral edge of the thick portion 112A of the support 112 of the first stem 110. This prevents entry of water or the like into the opening 120A of the second stem 120.

<Second Movable Contact 150>

The second movable contact 150 is disposed on an upper side of the metal contact 130. Also, the second movable contact 150 is disposed, together with an insulation sheet 160, on a first peripheral portion 140Cb (see FIG. 4) of the bottom surface 140C of the recessed portion 140B of the housing 140. The second movable contact 150 is a metal and flat-plate member having an annular shape in a plan view from the top (from the positive Z-axis direction). The second movable contact 150 includes a circular opening 150A at the center thereof in a plan view from the top (from the positive Z-axis direction). Thus, the operation part 111 of the first stem 110 can penetrate through the opening 150A of the second movable contact 150.

The second movable contact 150 includes an annular base 151 and a plurality of legs 152 projecting outward of the base 151. In the present embodiment, the second movable contact 150 includes four legs 152 that are disposed at 90° intervals. The four legs 152 are disposed at the four cut-out portions 140D that are formed in the recessed portion 140B of the housing 140. Also, the four legs 152 are disposed at the four second peripheral fixed contacts 146 provided at the bottom portions of the four cut-out portions 140D. That is, the second movable contact 150 is electrically connected to the four second peripheral fixed contacts 146 via the four legs 152.

In addition, in a state in which the metal contact 130 is not pressed by the first stem 110, the second movable contact

150 contacts an upper surface of the metal contact 130 (around the top thereof) at an annular portion of the base 151 along the opening 150A on the lower surface of the base 151. That is, the second movable contact 150 is electrically connected to the metal contact 130 in a state in which the metal contact 130 is not pressed by the first stem 110.

<Insulation Sheet 160>

The insulation sheet 160 is a sheet-like member formed of an insulating material and having a circular ring shape in a plan view from the top (from the positive Z-axis direction). The insulation sheet 160 is disposed between the metal contact 130 and a portion of the second movable contact 150 along the outer peripheral edge of the base 151. Thereby, the insulation sheet 160 insulates the metal contact 130 from the portion of the second movable contact 150 along the outer peripheral edge of the base 151 in order to avoid conduction therebetween. However, the insulation sheet 160 includes a circular opening 160A at the center thereof in a plan view from the top (from the positive Z-axis direction). Thus, the operation part 111 of the first stem 110 can penetrate through the opening 160A of the insulation sheet 160. Further, the insulation sheet 160 including the opening 160A can contact the portion of the base 151 of the second movable contact 150 along the opening 150A, with the metal contact 130.

<Metal Contact 130>

The metal contact 130 is an example of a "first movable contact". The metal contact 130 is disposed on a central portion 140Ca of the bottom surface 140C of the recessed portion 140B of the housing 140. The metal contact 130 is a dome-like member formed of a metal plate.

The metal contact 130 is disposed on the central portion 140Ca of the bottom surface 140C of the recessed portion 140B of the housing 140. In this state, the metal contact 130 contacts, at the peripheral edge thereof, a pair of first peripheral fixed contacts 142 provided on the central portion 140Ca of the bottom surface 140C of the recessed portion 140B, and the metal contact 130 is electrically connected to the pair of first peripheral fixed contacts 142.

When the first stem 110 is pressed, the top portion (central portion) of the metal contact 130 is pressed downward by the pressing surface 113A of the operation part 111 of the first stem 110. When a predetermined amount of pressing load is exceeded, the top portion rapidly deforms into a recessed shape (becomes inverted). As a result, the metal contact 130 contacts, at the rear side of the top portion thereof, the central fixed contact 144 that is provided at the central portion 140Ca of the bottom surface 140C of the recessed portion 140B. Thereby, the metal contact 130 is electrically connected to the central fixed contact 144.

The metal contact 130 has a spring property. Thus, when the pressing force applied from the first stem 110 is released, the metal contact 130 returns to the original projecting shape by the action of a repulsive force. In the present embodiment, the metal contact 130 includes a stacked structure in which two metal plates having the same shape are stacked. Accordingly, the operation load of the metal contact 130 is adjusted so as to impart a comfortable click sensation.

<Housing 140>

The housing 140 is a container-like member having a rectangular parallelepiped shape that is thin in the vertical direction (in the Z-axis direction). The housing 140 includes a recessed portion 140B having a shape that is recessed downward from an upper surface 140A. The recessed portion 140B houses a first stem 110, a second stem 120, a second movable contact 150, an insulation sheet 160, and a metal contact 130. For example, the housing 140 is formed through insert molding using a relatively hard insulating material (e.g., a hard resin or the like). On both sides of the housing 140 that are parallel to the Y-axis, claws 148 projecting outward are formed. When the frame 105 is attached to the upper surface 140A of the housing 140, the claws 148 are fitted into the openings 105C of the hooks 105B of the frame 105 and are engaged with the hooks 105B, thereby fixing the frame 105 to the housing 140.

As illustrated in FIG. 4, the central portion 140Ca of the bottom surface 140C of the recessed portion 140B is provided with a pair of first peripheral fixed contacts 142 and a central fixed contact 144. In the central portion 140Ca, the pair of first peripheral fixed contacts 142 are disposed side by side in the X-axis direction across the central fixed contact 144. By disposing the metal contact 130 in the central portion 140Ca, each of the pair of first peripheral fixed contacts 142 contacts the peripheral edge of the metal contact 130 and is electrically connected to the metal contact 130.

The central fixed contact 144 is disposed at the center of the central portion 140Ca. The central fixed contact 144 is electrically connected to the metal contact 130 by contacting the central portion of the metal contact 130 (i.e., a bottom side of the top portion thereof) when the top portion of the metal contact 130 deforms into a recessed shape. Thereby, the central fixed contact 144 is conductive to each of the pair of first peripheral fixed contacts 142 through the metal contact 130. For example, the first peripheral fixed contacts 142 and the central fixed contact 144 are formed by machining a metal plate.

As illustrated in FIG. 4, at the bottom surface 140C of the recessed portion 140B of the housing 140, externally of the central portion 140Ca, the first peripheral portion 140Cb having an annular shape in a plan view from the top (from the positive Z-axis direction) is formed. The first peripheral portion 140Cb is higher in height than the central portion 140Ca. The second movable contact 150 and the insulation sheet 160 are placed on the first peripheral portion 140Cb.

As illustrated in FIG. 4, at the bottom surface 140C of the recessed portion 140B of the housing 140, externally of the first peripheral portion 140Cb, the second peripheral portion 140Cc having an annular shape in a plan view from the top (from the positive Z-axis direction) is formed. The second peripheral portion 140Cc is higher in height than the first peripheral portion 140Cb. The first stem 110 and the second stem 120 are placed on the second peripheral portion 140Cc.

As illustrated in FIG. 4, the bottom surface 140C of the recessed portion 140B of the housing 140 is provided with four second peripheral fixed contacts 146 that are disposed at 90° intervals at positions corresponding to the four corners of the housing 140. Specifically, the recessed portion 140B of the housing 140 is provided with four cut-out portions 140D at 90° intervals, which are cut out outward (toward the corners of the housing 140). The four second peripheral fixed contacts 146 are provided on the bottom surface of each of the four cut-out portions 140D. For example, the second peripheral fixed contacts 146 are formed by machining a metal plate. The four legs 152 of the second movable contact 150 are placed on the four second peripheral fixed contacts 146. Thus, the four second peripheral fixed contacts 146 are always electrically connected to the second movable contact 150.

(How the Switch Device 100 Works)

FIGS. 6A to 8B are cross-sectional views illustrating how the switch device 100 according to one embodiment works. Of FIGS. 6A to 8B, FIGS. 6A, 7A, and 8A illustrate cross sections of the switch device 100 taken along a cross-sectional line that is parallel to the X-axis and passes through the center of the switch device 100. Of FIGS. 6A to 8B, FIGS. 6B, 7B, and 8B illustrate cross sections of the switch device 100 taken along a cross-sectional line that passes through the diagonal of the switch device 100.

In the example as illustrated in FIGS. 6A to 8B, the second movable contact 150 includes a plurality of elastic pieces 153 that project downward (on the negative Z-axis side) from the inner peripheral edge of the base 151 (an annular portion along the opening 150A). In the example as illustrated in FIGS. 6A to 8B, the plurality of elastic pieces 153 of the second movable contact 150 are configured to contact the top portion of the metal contact 130.

However, this is by no means a limitation. The second movable contact 150 need not necessarily include the plurality of elastic pieces 153, and may be configured such that the inner peripheral edge of the base 151 of the second movable contact 150 (the annular portion along the opening 150A) contacts the top portion of the metal contact 130.

Figure 6A:
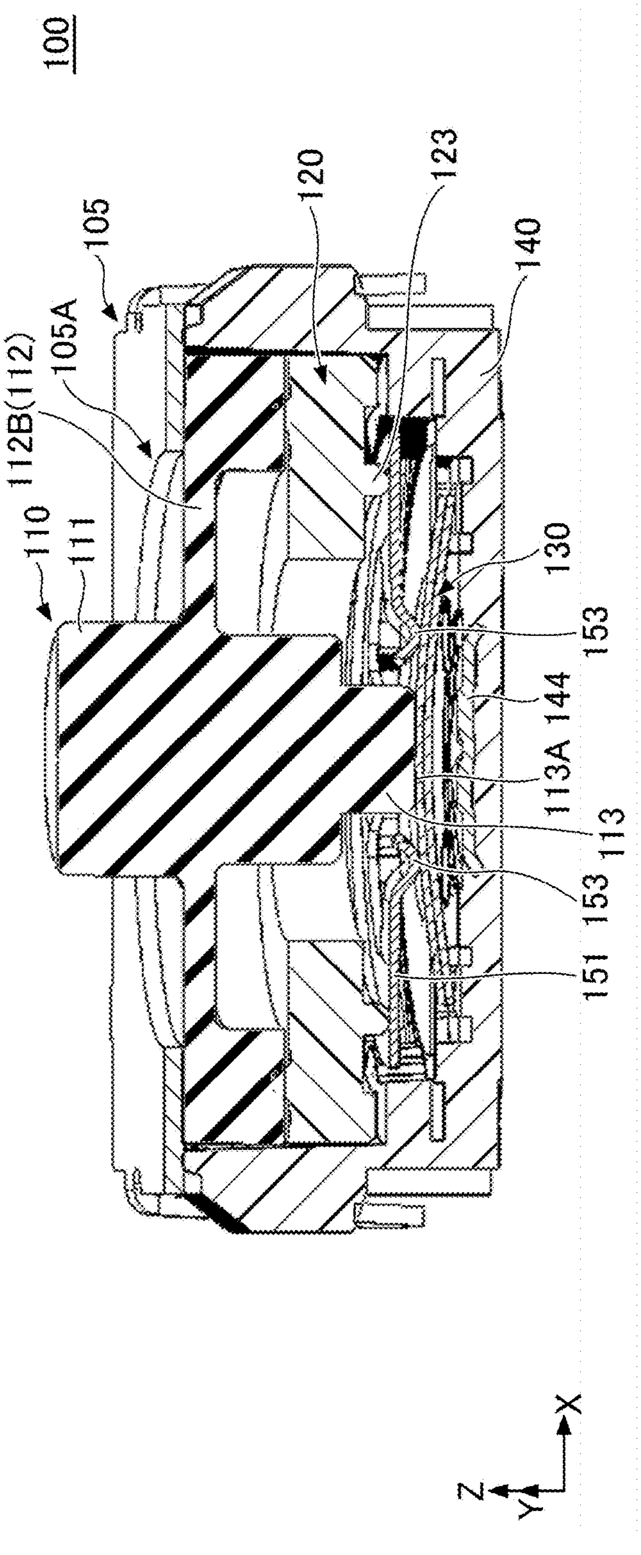
FIG. 6A is a cross-sectional view illustrating how the switch device according to one embodiment works.
Figure 6B:
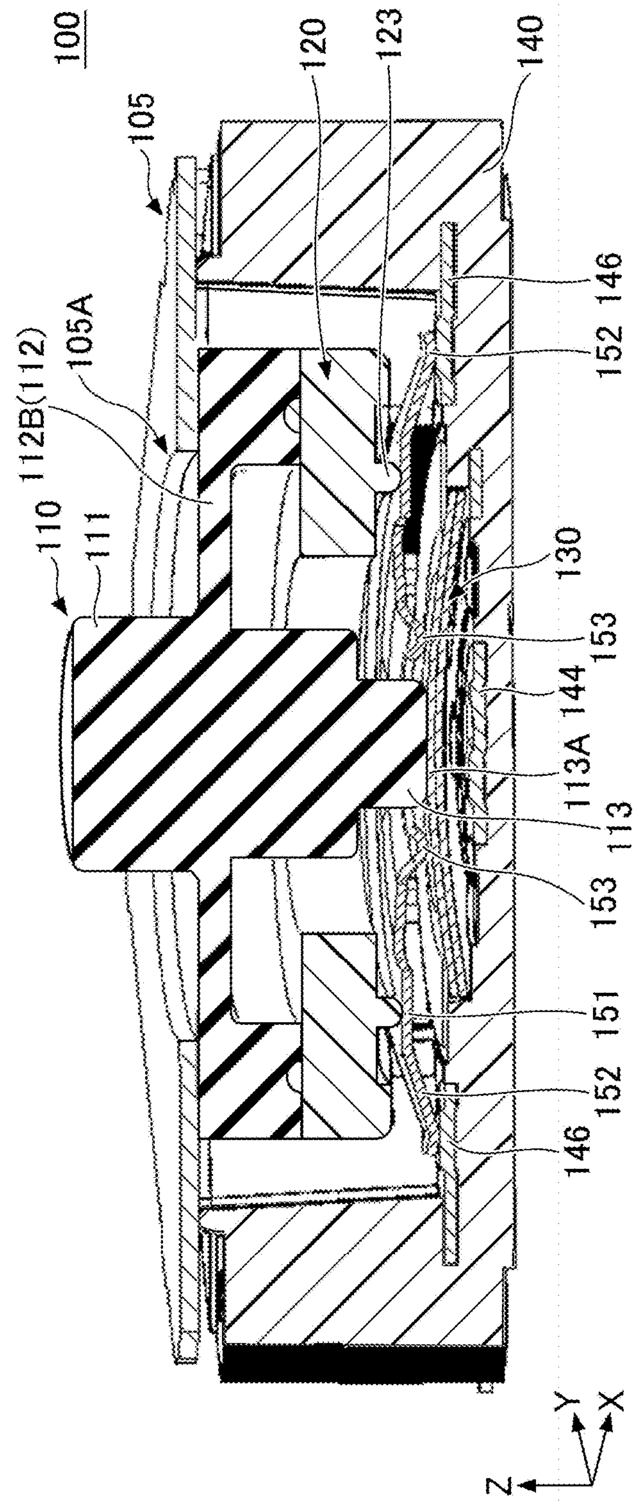
FIG. 6B is a cross-sectional view illustrating how the switch device according to one embodiment works.

FIGS. 6A and 6B illustrate the switch device 100 in a state in which the operation part 111 of the first stem 110 is not pressed. As illustrated in FIGS. 6A and 6B, when the operation part 111 of the first stem 110 is not pressed, the pressing surface 113A of the first stem 110 contacts the top portion of the metal contact 130. However, the metal contact 130 is not pressed by the pressing surface 113A, and the top portion of the metal contact 130 contacts the elastic pieces 153 that are provided to project from the inner peripheral edge of the base 151 of the second movable contact 150 (the annular portion along the opening 150A). As illustrated in FIG. 6B, the legs 152 of the second movable contact 150 are always in contact with the second peripheral fixed contact 146. As a result, the first peripheral fixed contact 142 and the second peripheral fixed contact 146, provided in the housing 140 of the switch device 100, are in the first ON state in which they are conductive through the second movable contact 150 and the metal contact 130.

Figure 7A:
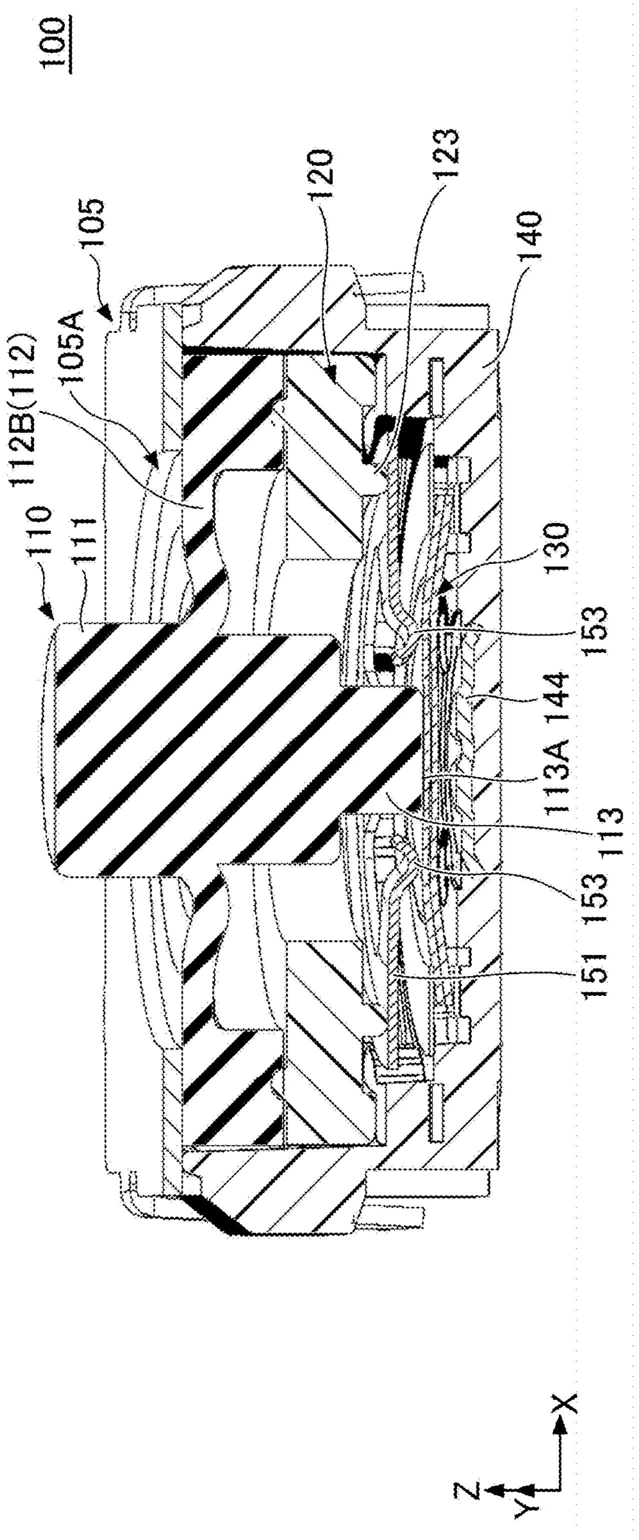
FIG. 7A is a cross-sectional view illustrating how the switch device according to one embodiment works.
Figure 7B:
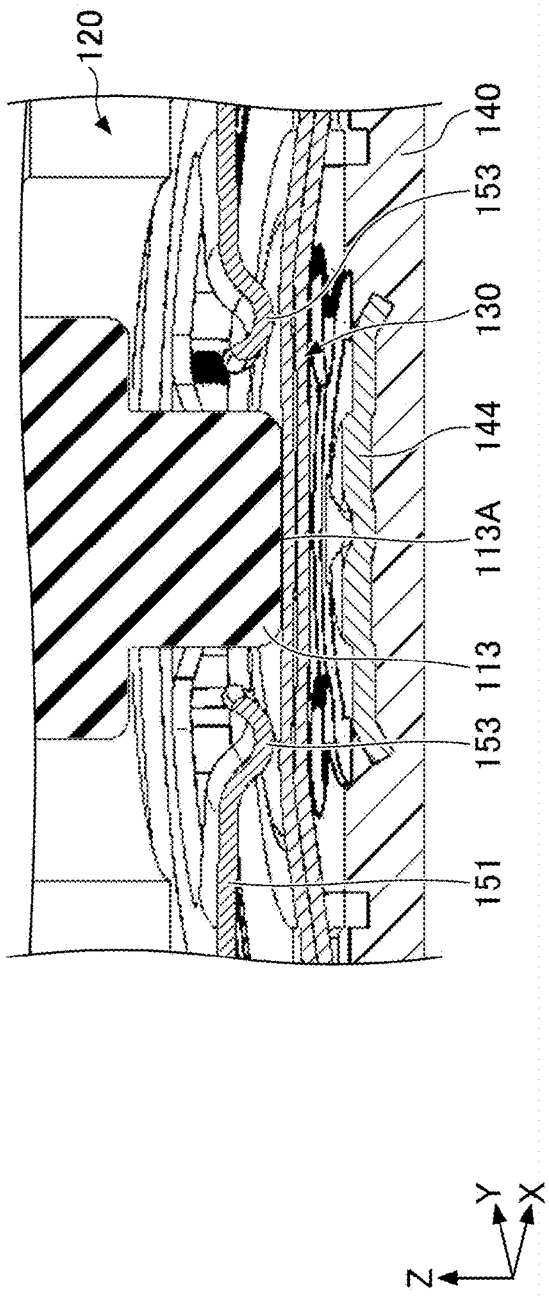
FIG. 7B is a cross-sectional view illustrating how the switch device according to one embodiment works.

FIGS. 7A and 7B illustrate the switch device 100 in a state in which the operation part 111 of the first stem 110 is pressed and the metal contact 130 is not inverted. As illustrated in FIGS. 7A and 7B, when the operation part 111 of the first stem 110 is pressed, the pressing part 113 of the first stem 110 moves downward, and accordingly, the thin portion 112B of the support 112 of the first stem 110 elastically deforms so as to bend. Thus, the pressing surface 113A of the pressing part 113 presses the top portion of the metal contact 130. The top portion of the metal contact 130 is pressed by the pressing surface 113A, thereby downwardly separating from the elastic pieces 153 of the second movable contact 150. As a result, the conduction between the second movable contact 150 and the metal contact 130 is lost in the switch device 100, and the switch device 100 enters an intermediate state between the first ON state and the second ON state.

Figure 8A:
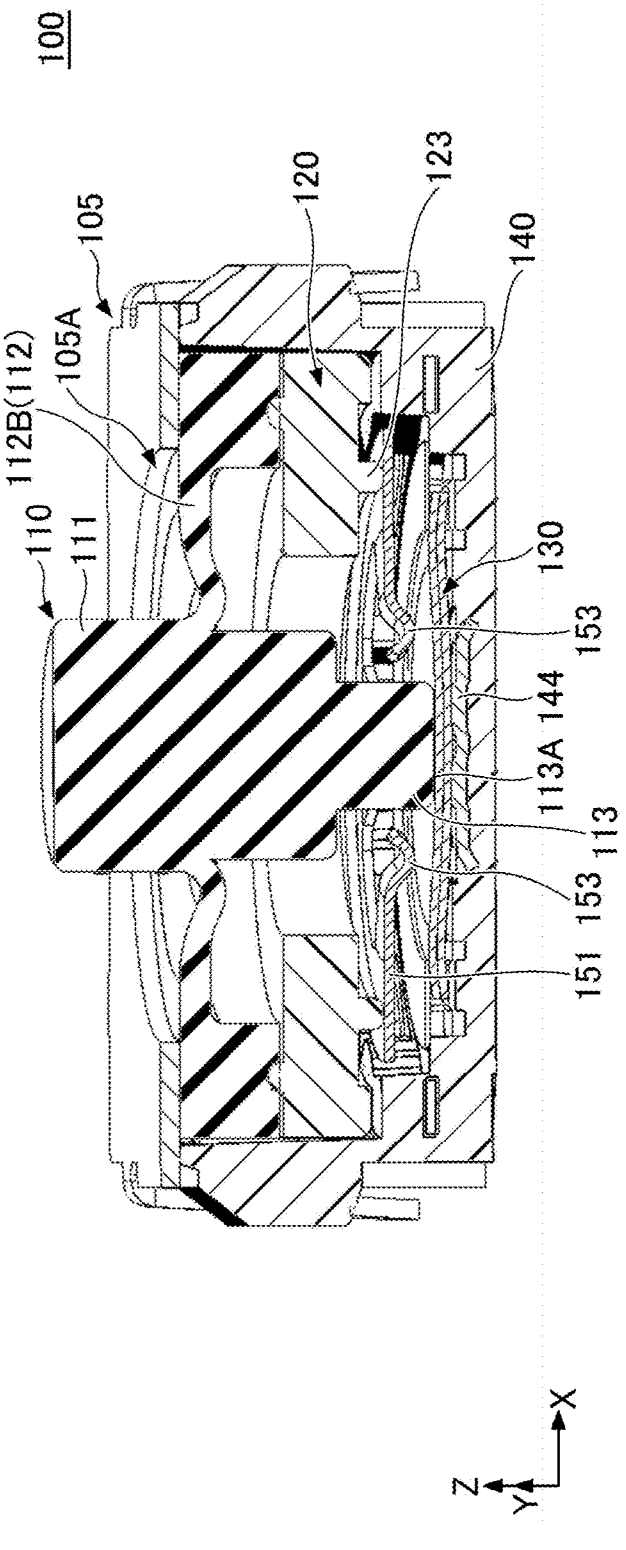
FIG. 8A is a cross-sectional view illustrating how the switch device according to one embodiment works.
Figure 8B:
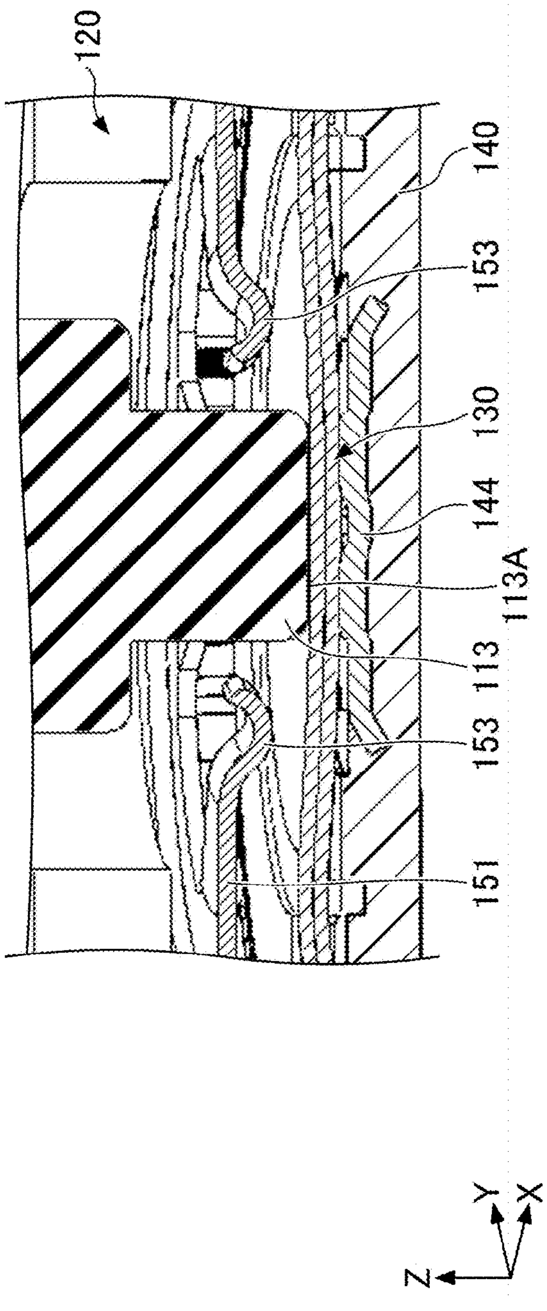
FIG. 8B is a cross-sectional view illustrating how the switch device according to one embodiment works.

FIGS. 8A and 8B illustrate the switch device 100 in a state in which the operation part 111 of the first stem 110 is pressed and the metal contact 130 is inverted. As illustrated in FIGS. 8A and 8B, when the load pressed against the operation part 111 of the first stem 110 exceeds a predetermined amount, the metal contact 130 is rapidly inverted such that the top portion thereof deforms into a recessed shape by the action of the pressing force received from the pressing surface 113A. As a result, as illustrated in FIGS. 8A and 8B, the central portion of the metal contact 130 contacts the central fixed contact 144. As a result, the switch device 100 is switched to the second ON state in which the first peripheral fixed contact 142 and the central fixed contact 144 (see FIG. 2), provided in the housing 140, are conductive through the metal contact 130.

When the pressing against the first stem 110 is released, the switch device 100 automatically returns to the first ON state as illustrated in FIG. 6 from the second ON state as illustrated in FIG. 8 by the action of the elastic forces of the metal contact 130 and the first stem 110.

(Effects)

As described above, the switch device 100 according to one embodiment includes the housing 140 that includes: the central fixed contact 144 and the first peripheral fixed contact 142 that are at the central portion 140Ca of the bottom surface 140C of the recessed portion 140B; the second peripheral fixed contact 146 that is at the peripheral portion of the bottom surface 140C of the recessed portion 140B; the metal contact 130 that is disposed on the upper side of the central portion 140Ca of the bottom surface 140C of the recessed portion 140B and is in contact with the first peripheral fixed contact 142; the second movable contact 150 that is disposed on the upper side of the metal contact 130 and is in contact with the metal contact 130 and the second peripheral fixed contact 146; and the first stem 110 that is disposed on the upper side of the second movable contact 150 and is configured to press the metal contact 130 toward the central fixed contact 144. In response to the first stem 110 pressing the metal contact 130 in response to pressing against the first stem 110, the metal contact 130 separates from the second movable contact 150 and becomes inverted, thereby contacting the central fixed contact 144.

Thus, the switch device 100 according to one embodiment can achieve switching between two switch circuits in a relatively simple configuration.

Further, according to the switch device 100 according to one embodiment, the second movable contact 150 includes the annular base 151 that has the opening 150A at the center thereof and the plurality of legs 152 projecting outward of the base 151, and the legs 152 are correspondingly disposed on the plurality of second peripheral fixed contacts 146.

Thus, the switch device 100 according to one embodiment can support the second movable contact 150 by the plurality of legs 152 in a stable and well-balanced manner.

According to the switch device 100 according to one embodiment, the second movable contact 150 includes the plurality of elastic pieces 153 that are provided to project from the peripheral edge of the opening 150A in the base 151, and contacts the metal contact 130 at the plurality of elastic pieces 153.

Thus, the switch device 100 according to one embodiment can more reliably contact the second movable contact 150 with the metal contact 130 by the plurality of elastic pieces 153.

Alternatively, in the switch device 100 according to one embodiment, the second movable contact 150 contacts the metal contact 130 at the peripheral edge of the opening 150A in the base 151.

Thus, the switch device 100 according to one embodiment can contact the second movable contact 150 with the metal contact 130 while forming the second movable contact 150 into a relatively simple shape.

According to the switch device 100 according to one embodiment, the first stem 110 presses the metal contact 130 through the opening 150A in the base 151 of the second movable contact 150.

As a result, the switch device 100 according to one embodiment can arrange the second movable contact 150 in a stacked arrangement with the first stem 110, the second movable contact 150 being on the bottom side of the first stem 110, thereby reducing the size of the switch device 100.

The switch device 100 according to one embodiment also includes the second stem 120 that is disposed between the first stem 110 and the second movable contact 150 and is configured to restrict upward movement of the second movable contact 150. As a result, the switch device 100 according to one embodiment can suppress rising of the second movable contact 150, thereby stably maintaining the state in which the second movable contact 150 is in contact with the metal contact 130 in the first ON state.

The switch device 100 according to one embodiment also includes the insulation sheet 160 that is disposed between the metal contact 130 and the second movable contact 150. Thus, the switch device 100 according to one embodiment can prevent contact of the second movable contact 150 with the metal contact 130 in the second ON state.

(Modified Example of the Switch Device 100)

Figure 9:
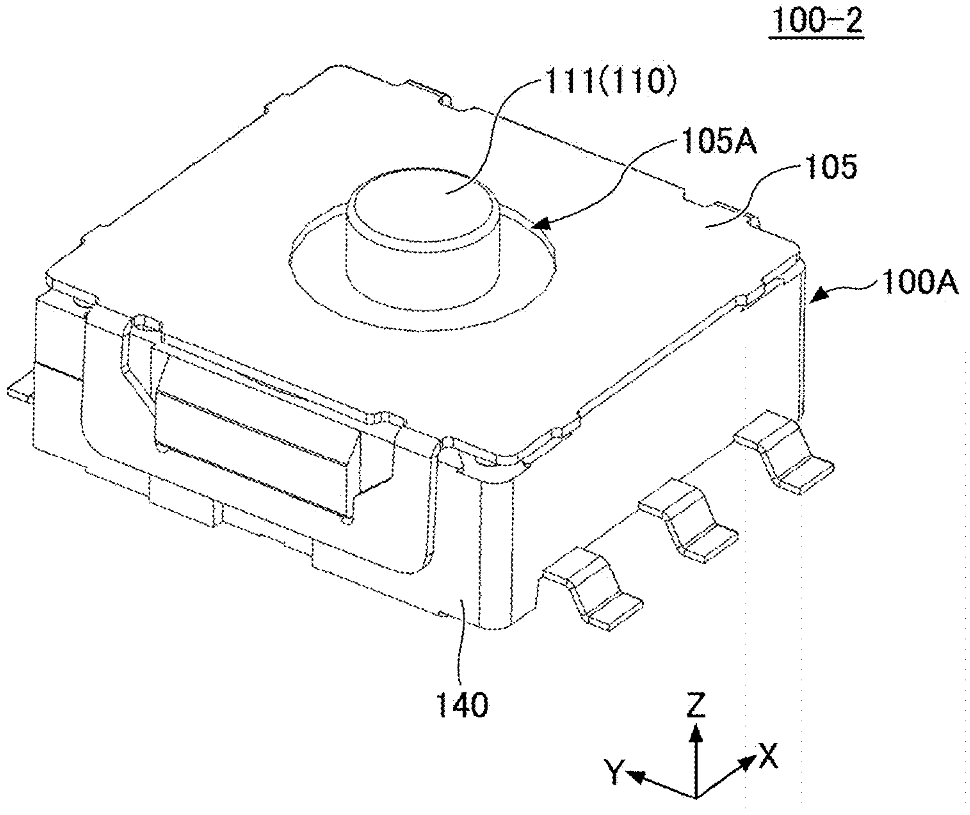
FIG. 9 is an external perspective view of a switch device according to a modified example of the embodiment.
Figure 10:
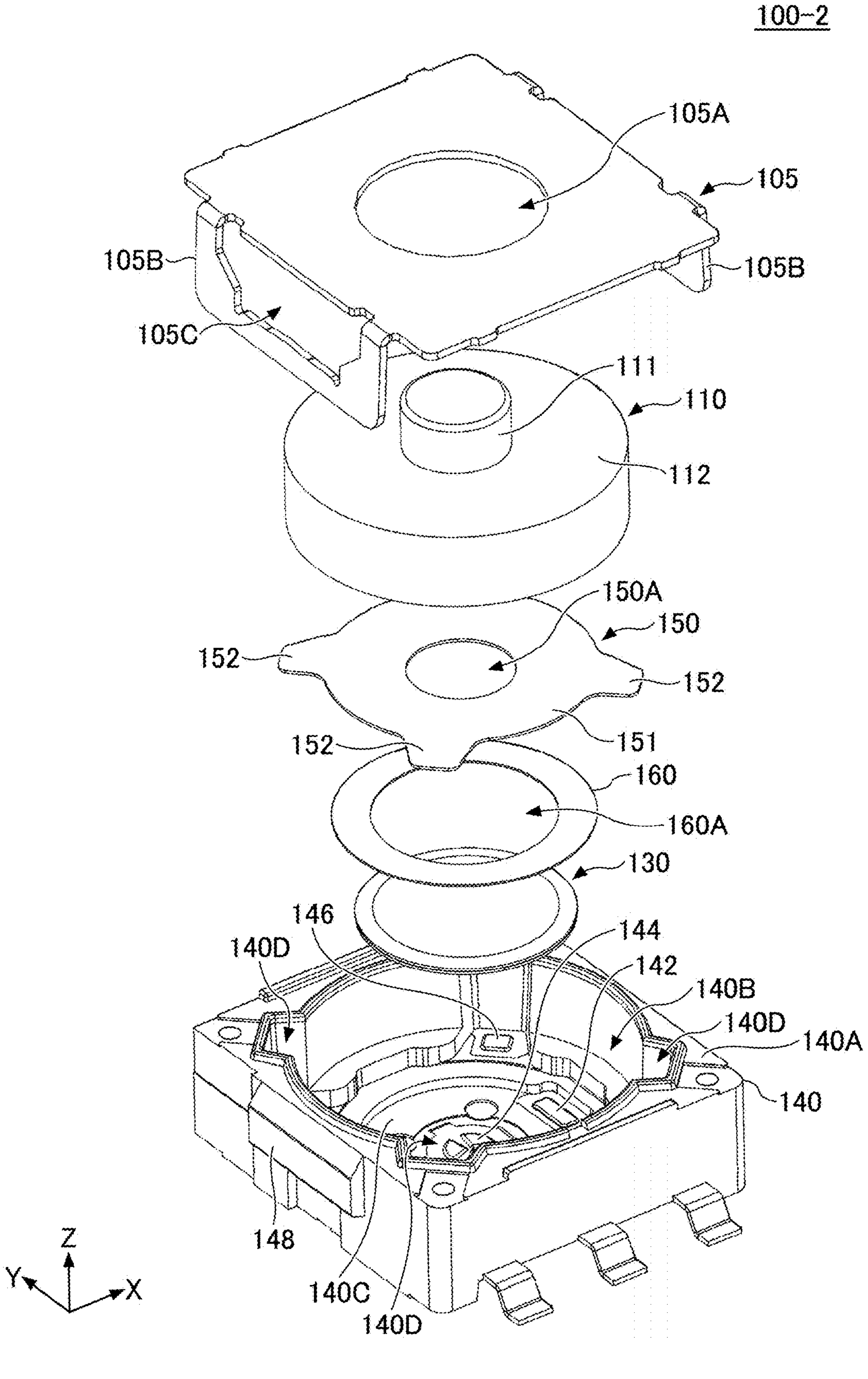
FIG. 10 is an exploded perspective view of the switch device according to the modified example of the embodiment.
Figure 11:
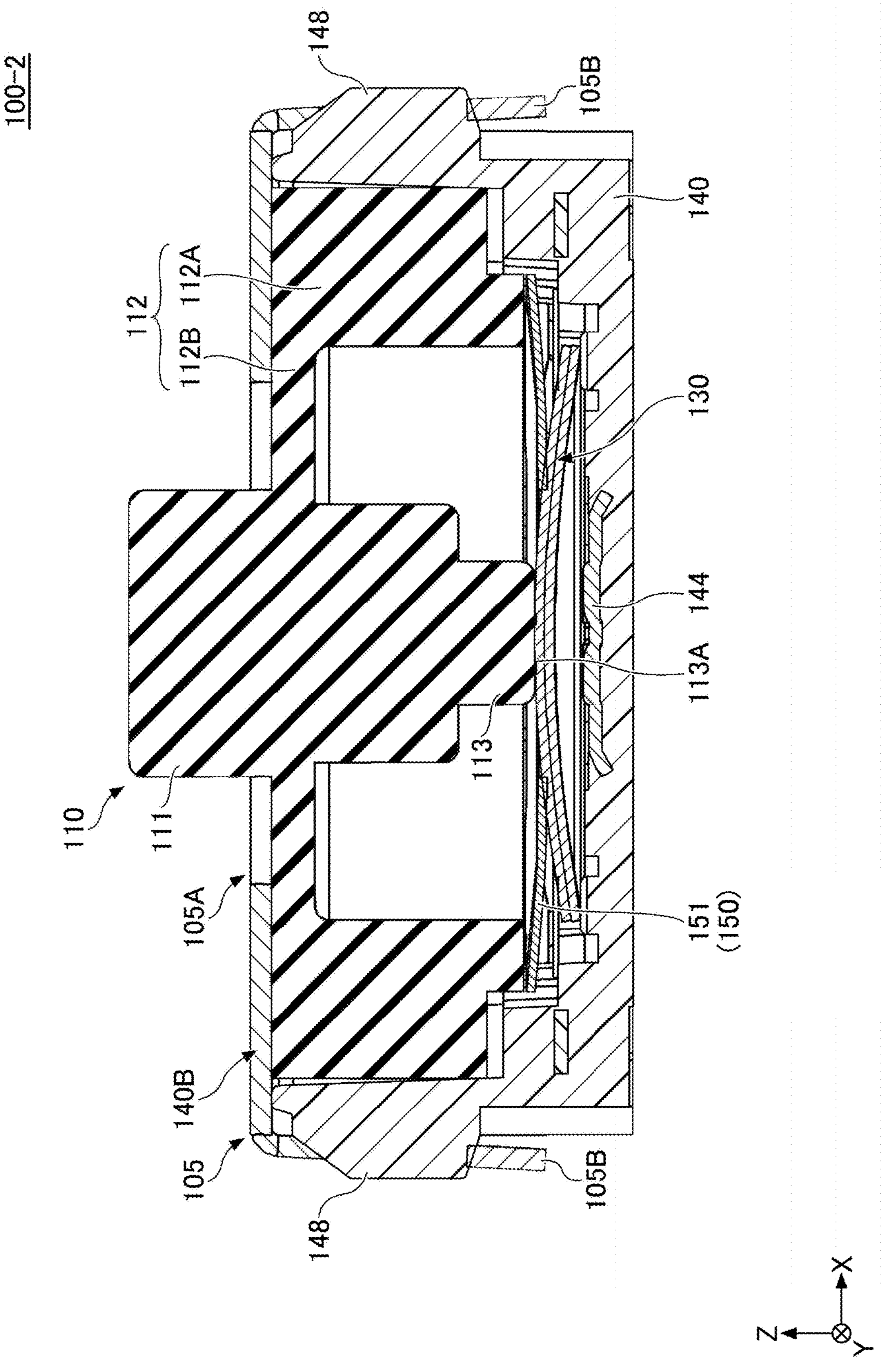
FIG. 11 is a cross-sectional view of the switch device according to the modified example of the embodiment.

Hereinafter, a modified example of the switch device 100 according to one embodiment will be described with reference to FIGS. 9 to 11. FIG. 9 is an external perspective view of a switch device 100-2 according to the modified example of the embodiment. FIG. 10 is an exploded perspective view of the switch device 100-2 according to the modified example of the embodiment. FIG. 11 is a cross-sectional view of the switch device 100-2 according to the modified example of the embodiment.

As illustrated in FIGS. 10 and 11, the switch device 100-2 according to the modified example differs from the switch device 100 in that the switch device 100-2 does not include a second stem 120. The thick portion 112A of the first stem 110 in the switch device 100-2 according to the modified example has a larger thickness in the vertical direction (in the Z-axis direction) than that in the switch device 100. According to the switch device 100-2 according to the modified example, the lower surface of the thick portion 112A of the first stem 110 contacts the upper surface of the base 151 of the second movable contact 150, thereby restricting upward movement of the second movable contact 150.

The switch device 100-2 according to the modified example can restrict upward movement of the second movable contact 150 without the second stem 120. Thus, the number of parts and the production cost can be reduced compared to the switch device 100.

According to the switch device according to one embodiment, switching between two switch circuits can be achieved in a relatively simple configuration.

Although one embodiment of the present invention has been described in detail above, the present invention is not limited to these embodiments and can be modified or changed in various ways within the scope of the gist of the present invention recited in the claims.

What is claimed is:

1. A switch device, comprising:
a housing that includes
a central fixed contact and a first peripheral fixed contact that are at a central portion of a bottom surface of a recessed portion of the housing, and
a second peripheral fixed contact that is at a peripheral portion of the bottom surface of the recessed portion;
a first movable contact that is disposed on an upper side of the central portion of the bottom surface of the recessed portion and is in contact with the first peripheral fixed contact;
a second movable contact that is disposed on an upper side of the first movable contact and is in contact with the first movable contact and the second peripheral fixed contact; and
a first stem that is disposed on an upper side of the second movable contact and is configured to press the first movable contact toward the central fixed contact, wherein
in response to pressing against the first stem, the first stem presses the first movable contact, and the first movable contact separates from the second movable contact and becomes inverted, thereby contacting the central fixed contact.

2. The switch device according to claim 1, wherein
the second movable contact includes
a base that has an annular shape and includes an opening at a center of the base, and
a plurality of legs that project outward of the base, and
the legs are correspondingly mounted on a plurality of second peripheral fixed contacts each being the second peripheral fixed contact.

3. The switch device according to claim 2, wherein
the second movable contact includes
a plurality of elastic pieces projecting from a peripheral edge of the opening in the base, and
the second movable contact contacts the first movable contact at the elastic pieces.

4. The switch device according to claim 2, wherein
the second movable contact contacts the first movable contact at a peripheral edge of the opening in the base.

5. The switch device according to claim 2, wherein
the first stem that penetrates through the opening in the base of the second movable contact, and is configured to press the first movable contact.

6. The switch device according to claim 3, wherein
the first stem that penetrates through the opening in the base of the second movable contact, and is configured to press the first movable contact.

7. The switch device according to claim 4, wherein
the first stem that penetrates through the opening in the base of the second movable contact, and is configured to press the first movable contact.

8. The switch device according to claim 1, further comprising:
a second stem that is disposed between the first stem and the second movable contact, and is configured to restrict upward movement of the second movable contact.

9. The switch device according to claim 2, further comprising:
a second stem that is disposed between the first stem and the second movable contact, and is configured to restrict upward movement of the second movable contact.

10. The switch device according to claim 3, further comprising:
a second stem that is disposed between the first stem and the second movable contact, and is configured to restrict upward movement of the second movable contact.

11. The switch device according to claim 4, further comprising:
a second stem that is disposed between the first stem and the second movable contact, and is configured to restrict upward movement of the second movable contact.

12. The switch device according to claim 1, further comprising:

an insulation sheet that is disposed between the first movable contact and the second movable contact.

13. The switch device according to claim 2, further comprising:

an insulation sheet that is disposed between the first movable contact and the second movable contact.

14. The switch device according to claim 3, further comprising:

an insulation sheet that is disposed between the first movable contact and the second movable contact.

15. The switch device according to claim 4, further comprising:

an insulation sheet that is disposed between the first movable contact and the second movable contact.

* * * * *